(12) United States Patent
Kawashima

(10) Patent No.: US 8,560,965 B2
(45) Date of Patent: Oct. 15, 2013

(54) DISPLAY DEVICE FOR DISPLAYING SETUP SCREEN WITH SCREEN NAVIGATION PATH

(75) Inventor: Tsuyoshi Kawashima, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 827 days.

(21) Appl. No.: 12/748,769

(22) Filed: Mar. 29, 2010

(65) Prior Publication Data

US 2010/0275155 A1    Oct. 28, 2010

(30) Foreign Application Priority Data

Apr. 28, 2009    (JP) ................................ 2009-108972

(51) Int. Cl.
*G06F 3/048*    (2013.01)
(52) U.S. Cl.
USPC ............ 715/820; 715/810; 715/818; 715/819
(58) Field of Classification Search
USPC ......... 715/205–208, 708, 712, 713, 772, 783, 715/786, 787, 804, 805, 806, 807, 818, 819, 715/820
See application file for complete search history.

(56) References Cited

U.S. PATENT DOCUMENTS

| 7,962,843 | B2* | 6/2011 | Milic-Frayling et al. | 715/206 |
| 2003/0197738 | A1* | 10/2003 | Beit-Zuri et al. | 345/786 |
| 2004/0207666 | A1* | 10/2004 | Hally et al. | 345/854 |
| 2005/0132297 | A1* | 6/2005 | Milic-Frayling et al. | 715/745 |
| 2006/0059441 | A1* | 3/2006 | Todd | 715/853 |
| 2006/0123361 | A1* | 6/2006 | Sorin et al. | 715/854 |
| 2006/0136832 | A1* | 6/2006 | Keller et al. | 715/765 |

FOREIGN PATENT DOCUMENTS

| JP | H05-233193 | A | 9/1993 |
| JP | 9-269883 | A | 10/1997 |
| JP | 2002-335465 | A | 11/2002 |
| JP | 2005-043957 | A | 2/2005 |
| JP | 2006-236142 | A | 9/2006 |

OTHER PUBLICATIONS

Official Action dated Feb. 15, 2011 received from the Japanese Patent Office in corresponding Japanese Patent Application No. JP 2009-108972.

* cited by examiner

*Primary Examiner* — Enrique Iturralde
(74) *Attorney, Agent, or Firm* — Scully, Scott, Murphy & Presser, P.C.

(57) ABSTRACT

Provided are a display device and a display method for displaying a setup screen with a screen navigation path. In various examples, provided are a user-friendly display device and a user-friendly display method that enable a user to understand in advance what information will be displayed in a setup screen when a reverse transition operation (e.g., a return or cancel operation) is performed.

15 Claims, 7 Drawing Sheets

Fig. 2

SCREEN MANAGEMENT TABLE 12b

| HIERARCHICAL LEVEL | 1 | 2 | 3 | | 4 | 5 | | |
|---|---|---|---|---|---|---|---|---|
| SCREEN TITLE/ TITLE ID | MENU ID00 | GENERAL SETUP ID10 | MODE | ID11 | | | | |
| | | | TIMER | ID12 | | | | |
| | | | PAPER TYPE | ID13 | | | | |
| | | | PAPER SIZE | | | | | |
| | | | VOLUME | ID14 | | | | |
| | | NETWORK ID90 | WLAN | ID91 | TCP/IP ID93 | IP ADDRESS | ID94 |
| | | | | | | SUBNET MASK | ID95 |
| | | | | | | GATEWAY | ID96 |
| | | | RESET FACTORY | ID92 | | | |

Fig. 3

SCREEN TRANSITION TABLE 12c

| HIERARCHICAL LEVEL | 1 | | 2 | | 3 | | 4 | | 5 | |
|---|---|---|---|---|---|---|---|---|---|---|
| SCREEN TITLE/ EVENT/ DESTINATION SCREEN TITLE | MENU | NONE | GENERAL SETUP | RETURN BUTTON PRESSED | MODE TIMER | RETURN BUTTON PRESSED | | | | |
| | | | | MENU | PAPER TYPE | RETURN BUTTON PRESSED | GENERAL SETUP | | | |
| | | NONE | | | PAPER SIZE | RETURN BUTTON PRESSED | GENERAL SETUP | | | |
| | | | | | VOLUME | RETURN BUTTON PRESSED | GENERAL SETUP | | | |
| | | | NETWORK | RETURN BUTTON PRESSED | WLAN | RETURN BUTTON PRESSED | NETWORK | TCP/IP | RETURN BUTTON PRESSED | WLAN |
| | | | | MENU | | | | | IP ADDRESS | RETURN BUTTON PRESSED | TCP/IP |
| | | | | | | | | | SUBNET MASK | RETURN BUTTON PRESSED | TCP/IP |
| | | | | | | | | | GATEWAY | RETURN BUTTON PRESSED | TCP/IP |
| | | | | | RESET FACTORY | CANCEL BUTTON PRESSED | MENU | | | |

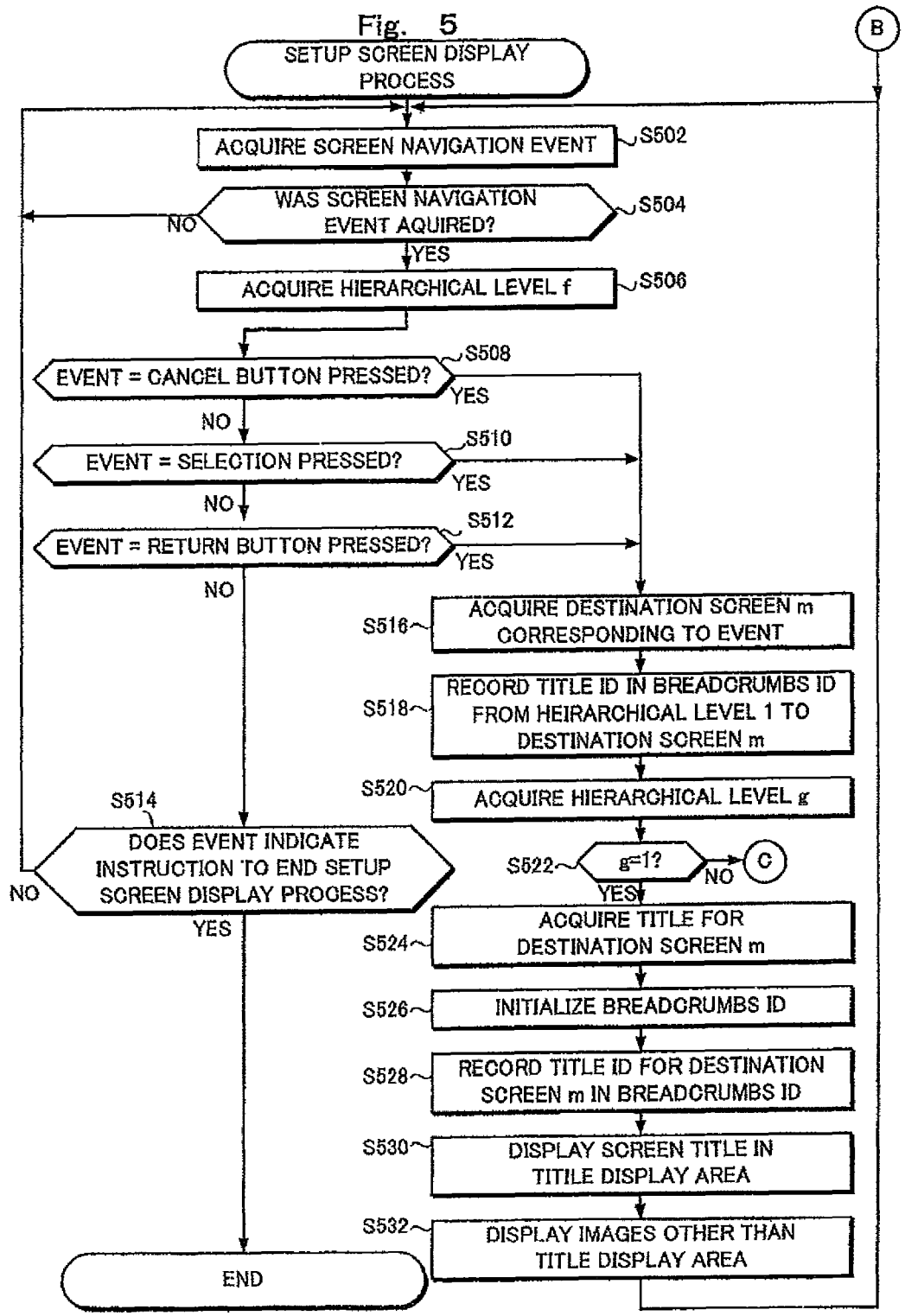

DISPLAY DEVICE FOR DISPLAYING SETUP SCREEN WITH SCREEN NAVIGATION PATH

CROSS REFERENCE TO RELATED APPLICATION

This application claims priority from Japanese Patent Application No. 2009-108972 filed Apr. 28, 2009. The entire content of this priority application is incorporated herein by reference.

TECHNICAL FIELD

The present invention relates to a display device for displaying a setup screen with a screen navigation path.

BACKGROUND

A multifunction peripheral is well known in the art as a single device capable of implementing a plurality of functions, such as a facsimile function, printer function, scanner function, and copier function. The multifunction peripheral allows a user to modify various setting items, such as resolution, density, and zoom percentage. The user can execute a desired operation on the multifunction peripheral after modifying the setting values as desired.

For example, the user may follow the procedure below to modify setting values for the multifunction peripheral. First, the multifunction peripheral displays a setup menu screen in a display panel provided on the multifunction peripheral. The menu screen includes various choices for each function of the multifunction peripheral, such as facsimile setup and scanner setup, as well as a general setup selection. When the user selects one of the choices listed in the menu, the multifunction peripheral changes the display on the display panel to a list of setting items related to the selected function.

When the user selects one of the setting items from the displayed list, the multifunction peripheral changes the display on the display panel to a modification screen in which the user can modify the value assigned to the setting item. While the modification screen is displayed, the user may input or modify the value assigned to the setting item as desired.

As the user performs operations to navigate through the prepared screens in this way, data indicating the path that the user has taken to arrive at the current screen may also be displayed in the display panel together with the current screen. One conventional format for displaying this path is called "breadcrumbs."

Breadcrumbs (or "breadcrumb trail") is a format for displaying the name of each screen that the user has navigated through to arrive at the current screen in the order displayed, such as in the example "Menu screen>Facsimile setup>Resolution." Through the breadcrumbs displayed with each screen, the user can determine to which function and to which setting item the current screen is related.

SUMMARY

During the process of navigating through various screens through repeated operations, the user at times may wish to cancel settings made previously or to navigate to a setup screen related to a different function. To provide for such situations, the control panel or the like of the multifunction peripheral is sometimes provided with a Return key and a Cancel key, for example, allowing the user to input instructions in order to navigate from the current screen to a screen in a higher hierarchical level.

However, the user may be inconvenienced when performing operations to navigate to screens in higher levels because often the user cannot correctly identify the screen that will be displayed when performing such operations prior to executing the operations. For example, if the user presses the Cancel key with the aim of navigating to a screen one level higher, the display may actually be returned to a screen at a higher level than the user expected, forcing the user to repeat several operations.

In view of the foregoing, it is an object of the present invention to provide a user-friendly display device that enables the user to understand in advance what information will be displayed in a display section when a reverse transition operation (e.g., a return or cancel operation) is performed.

In order to attain the above and other objects, the invention provides a display device. The display device includes a display unit, a first storing unit, a first display control unit, a second display control unit, a marking unit, a first transition unit, and a second transition unit. The display unit includes a first portion and a second portion. The first storing unit stores a plurality of title strings corresponding to a plurality of screen images including a base screen image and being arranged hierarchically from the base screen image along a screen navigation path starting from the base screen image. The first display control unit displays a first screen image on the first portion. The second display control unit displays a navigation string on the second portion based on screen navigation data, the screen navigation data indicating relationships between the screen images. The navigation string includes at least one of the title strings corresponding to at least one of the screen images which is positioned in a part of the screen navigation path from the base screen image to the first screen image. The marking unit attaches a mark to one of the title strings corresponding to a third screen image of a higher hierarchical level than the first screen image and included in the navigation string in order to distinguish the title string attached with the mark from the other title strings. The first transition unit changes the first screen image displayed on the first portion to a second screen image of a lower hierarchical level than the first screen image when a user performs a prescribed selection, thereby displaying the second screen image on the first portion. The second transition unit changes the first screen image to the third screen image when the user performs a reverse transition operation, thereby displaying the third screen image on the first portion.

According to another aspect, the present invention provides a method for displaying one of a plurality of screen images on a display unit of a display device. The plurality of screen images includes a base screen image and being arranged hierarchically from the base screen image along a screen navigation path starting from the base screen image. The method includes, (a) displaying a first screen image on a first portion of the display unit based on screen navigation data, the screen navigation data indicating relationships between the screen images, (b) displaying a navigation string on a second portion of the display unit, the navigation string including at least one of title strings corresponding to at least one of the screen images which is positioned in a part of the screen navigation path from the base screen image to the first screen image, (c) attaching a mark to one of the title strings corresponding to a third screen image of a higher hierarchical level than the first screen image and included in the navigation string in order to distinguish the title string attached with the mark from the other title strings, (d) changing the first screen image displayed on the first portion to a second screen image of a lower hierarchical level than the first screen image when a user performs a prescribed selection, thereby displaying the second screen image on the first portion, and (e) changing the first screen image to the third screen image when the user performs a reverse transition operation, thereby displaying the third screen image on the first portion.

BRIEF DESCRIPTION OF THE DRAWINGS

The particular features and advantages of the invention as well as other objects will become apparent from the following description taken in connection with the accompanying drawings, in which:

FIG. 2 is an explanatory diagram showing a sample configuration of a screen management table;

FIG. 3 is an explanatory diagram showing a sample configuration of a screen transition table;

FIG. 5 is a flowchart showing a setup screen display process;

DETAILED DESCRIPTION

Figure 1:
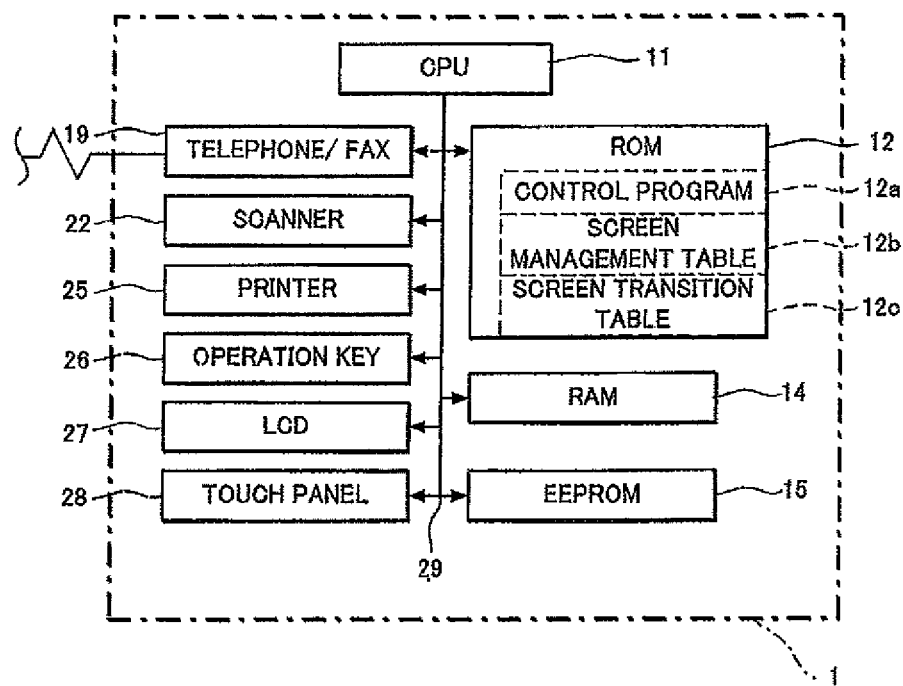
FIG. 1 is a schematic diagram showing an electrical construction of a multifunction peripheral according to an embodiment of the present invention.

A multifunction peripheral (MFP) 1 according to an embodiment of the invention will be described while referring to the accompanying drawings wherein like parts and components are designated by the same reference numerals to avoid duplicating description.

The MFP 1 is a multifunction peripheral having multiple functions, including a facsimile function and a printer function. The MFP 1 allows a user to modify values of various setting items defining operating conditions and the like for each function. The MFP 1 has a plurality of setup screens by which the user can modify values for each setting item.

As shown in FIG. 1, the MFP 1 includes a CPU 11, a ROM 12, a RAM 14, an EEPROM 15, a telephone/fax unit 19, a scanner 22, a printer 25, an operation key 26, a LCD 27, and a touch panel 28. These are interconnected with a bus line 29 with each other. Although not shown in the drawings, the MFP 1 further includes an interface for connecting with a personal computer and LAN and other components.

The ROM 12 is a nonvolatile memory in which a control program 12a, a screen management table 12b, and a screen transition table 12c are stored. The CPU 11 executes a setup screen display process shown in FIGS. 5 and 6 based on the control program 12a. The screen management table 12b and the screen transition table 12c are pre-stored in the ROM 12 during the manufacturing stage of the MFP 1. The tables 12b and 12c will be described later with reference to FIGS. 2 and 3.

The RAM 14 is a volatile memory for temporarily storing data. The EEPROM 15 is a nonvolatile memory for storing various setting items and fixed values, and retains data even after power is turned OFF.

The LCD 27 has an LCD panel (not shown). The MFP 1 displays prepared setup screens in the LCD panel of the LCD 27 as needed. These setup screens will be described later with reference to FIG. 3. The touch panel 28 is a type of input device and is disposed parallel and in proximity to a display surface of the LCD panel. When the user touches the display surface of the LCD panel with a finger or the like, the touch panel 28 detects the position of the finger with respect to the LCD panel.

The MFP 1 can switch between a print mode for printing, a facsimile mode for receiving and sending a facsimile, and a setup mode for changing values for the setting items.

FIG. 2 shows a sample configuration of the screen management table 12b. The screen management table 12b defines a hierarchical level, a screen title, and a title ID for each setup screen that can be displayed in the LCD panel of the LCD 27 for accepting user selections. The MFP 1 organizes and manages the plurality of the setup screens in hierarchical levels based on the screen management table 12b. When the user performs a prescribed selection operation in the LCD panel displaying a higher-level setup screen, the MFP 1 changes the display in the LCD panel to a lower-level setup screen.

A "level number" is a value indicating the hierarchical level to which each setup screen belongs. In the example shown in FIG. 2, each of the setup screens belongs to one of first through fifth levels. The screen title is configured of a descriptive character string by which the content of the setup screen can be discerned. One screen title is uniquely associated with each setup screen. The title ID is a resource ID in the form of a character string. One title ID is uniquely assigned to each screen title and is used to create a breadcrumbs 35b (FIG. 4A), as will be described later.

As shown in FIG. 2, a menu screen having a screen title "Menu" is defined in the screen management table 12b as a setup screen in the first level (hierarchical level 1). Setup screens defined for the second level (hierarchical level 2) directly beneath the first level are a general setup screen having a screen title "General Setup" and a network setup screen having a screen title "Network." Similarly, the screen management table 12b defines setup screens belonging to the third level (hierarchical level 3) directly beneath the second level, setup screens belonging to the fourth level (hierarchical level 4) positioned directly beneath the third level, and setup screens belonging to the fifth level (hierarchical level 5) positioned directly beneath the fourth level.

The MFP 1 transitions between the setup screens from the top hierarchical level to each lower level in sequence. For example, in order to display a TCP/IP setup screen (having a screen title "TCP/IP") belonging to the fourth level, the MFP 1 first displays the menu screen of the first level, then displays the network setup screen of the second level, then displays a LAN setup screen (having a screen title "WLAN") of the third level, and finally displays the TCP/IP setup screen of the fourth level.

The MFP 1 according to the embodiment changes the display on the LCD 27 so as to navigate to setup screens not only in order from higher levels to lower levels, but also in the direction from lower levels to higher levels when the user performs a prescribed operation.

FIG. 3 shows a sample configuration of the screen transition table 12c. The screen transition table 12c defines destination setup screens and the like for cases in which the display is changed in a direction from lower levels to higher levels. Specifically, the screen transition table 12c stores correlations between hierarchical levels, screen titles, events, and destination screen titles.

The "hierarchical level" and the "screen title" are identical to those stored in the screen management table 12b and, hence, a description of these elements will not be repeated here.

The events stored in the screen transition table 12c may be either "Return button pressed" or "Cancel button pressed." When one of the events stored in the screen transition table 12c occurs, i.e., when one of either a Return button 36a or a Cancel button 36b (described later) is pressed, the MFP 1 changes the setup screen currently displayed on the LCD 27 to a setup screen in a higher hierarchical level. This process will be described later in greater detail with reference to FIGS. 4A-4D.

A "destination screen title" is a screen title for a destination setup screen that is displayed when an event occurs while a setup screen corresponding to an associated "screen title" is displayed. For example, an event associated with a screen title "Mode Timer" in the third level is "Return button pressed" and a destination screen title is "General Setup" for a setup screen belonging to the second level. Accordingly, if the event "Return button pressed" occurs while a setup screen corresponding to "Mode Timer" is displayed, the MFP 1 changes the currently displayed third-level setup screen to the second-level setup screen corresponding to "General Setup."

Similarly, if the event "Cancel button pressed" occurs while a setup screen corresponding to "Reset Factory" is displayed, the MFP 1 changes the third-level setup screen having the screen title "Reset Factory" to the menu screen belonging to the first level, that is, two levels higher than the current level.

Thus, when changing the display in a direction from a lower level to a higher level, in some cases the MFP 1 according to the embodiment returns to a setup screen one level above the current screen, and in other eases returns to a setup screen two levels or more above the current screen. The reasoning behind this is that the MFP 1 navigates to the most suitable setup screen based on a predicted sequence of operations that the user will perform after the display is changed to a higher level. However, this process is not useful to the user unless the user knows before actually performing the operation how many levels upward the MFP 1 navigates to reach the destination setup screen.

Thus, the MFP 1 according to the embodiment is configured to display an indicator on the LCD 27 indicating the destination setup screen so that the user can identify in advance a setup screen to which the display will be returned when the user performs a prescribed operation.

Figure 4A:
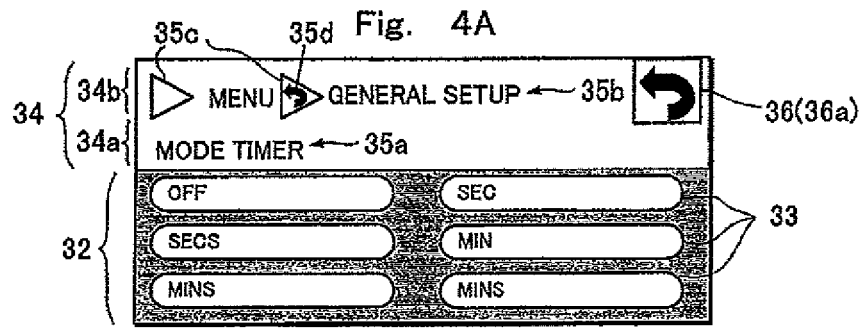
FIG. 4A is a "Mode Timer" screen having a Return button displayed on a LCD of the multifunction peripheral.

Images displayed in the LCD panel of the LCD 27 during the setup mode will be described. FIGS. 4A-4D shows screen images illustrating a sample transition of display on the LCD 27. As shown in FIG. 4A, the display area of the LCD panel includes a selection display area 32, a screen description area 34, and a Return button area 36.

A setup screen is drawn in the selection display area 32. The setup screen includes various selections 33 that can be operated by the user to perform a selection. Each selection 33 is a graphic image that functions as a button by which the user can select a setup screen positioned one level below the current setup screen, or a setting value. Each selection 33 also includes a character string expressing either the screen title of a setup screen positioned one level below the level of the currently displayed setup screen, or a setting value to be set in association with the currently displayed setup screen.

In the example shown in FIG. 4A, a setup screen of the third level having the screen title "Mode Timer" is displayed in the selection display area 32. This setup screen includes selections 33 depicting setting values that may be selected. When the user performs an operation to touch a selection 33 in the LCD panel, the MFP 1 stores a setting value associated with the touched selection 33 in the EEPROM 15, for example.

When the selections 33 depict screen titles for setup screens located one level below the current setup screen, the MFP 1 changes the display on the LCD 27 to the setup screen corresponding to the screen title in the selection 33 selected by the user. The operation to touch a selection 33 is equivalent to a "prescribed selection operation," where the prescribed selection operation may comprise an operation to select one of the displayed selections 33 using the operating keys 26, for example.

The screen description area 34 includes a title display area 34a occupying the lower half thereof, and a breadcrumbs display area 34b occupying the upper half thereof. The title display area 34a is provided for displaying a screen title 35a for the setup screen currently displayed on the selection display area 32.

The breadcrumbs display area 34b serves to display the breadcrumbs 35b. The breadcrumbs 35b is a character string formed by arranging the screen title corresponding to each setup screen that has been displayed up to the currently displayed setup screen in a single horizontal line in order of hierarchical level. In the example shown in FIG. 4A, a character string formed by concatenating all screen titles displayed up to, but not including, the currently displayed setup screen of the third level (i.e., a screen title of the first level and a screen title of the second level) is displayed as the breadcrumbs 35b. Based on the breadcrumbs 35b, the user can determine a screen navigation path leading up to the currently displayed setup screen.

The MFP 1 also adds a triangular separating character 35c to the head of each screen title in the breadcrumbs 35b for separating the screen titles. Based on the separating characters 35c, the user can identify each screen title in the breadcrumbs 35b and, thus, can easily understand the screen navigation path.

The Return button area 36 serves as a button that shifts the display in the selection display area 32 from the currently displayed setup screen to the setup screen belonging to a level higher than the level of the currently displayed setup screen. For example, if the currently displayed setup screen belongs to the third level and the user wishes to return to a setup screen in the first or second level, the user can navigate to this desired level by operating the Return button area 36. An operation to touch the Return button area 36 corresponds to a "reverse transition operation." The MFP 1 also draws a return icon, such as an arrow indicating a U-turn, or an "X" symbol in the Return button area 36. The Return button area 36 having a return icon will be referred to as the Return button 36a, while a Return button area 36 with an "X" symbol will be referred to as the Cancel button 36b.

Further, in order to indicate to the user what destination setup screen will be displayed if the user operates the Return button area 36, the MFP 1 displays a separating character 35c in front of the screen title for the destination setup screen in the breadcrumbs 35b using a different format from the other separating characters 35c. More specifically, the MFP 1 draws a return position marker 35d within only the separating character 35c added to the head of the screen title for the destination setup screen. Thus, this separating character 35c functions as an indicator indicating the destination setup screen of the reverse transition operation.

In the screen image shown in FIG. 4A, for example, the return position marker 35d is drawn only within the separating character 35c added to the head of the screen title "General Setup." By viewing the breadcrumbs 35b, the user can tell before operating the Return button area 36 that the display will change to the setup screen having the screen title "General Setup" when the user operates the Return button area 36. If the user wishes to change to this setup screen after confirming the setup screen as the destination setup screen, the user simply presses the Return button area 36. As a result, the MFP 1 changes the display to the screen shown in FIG. 4B.

Figure 4B:
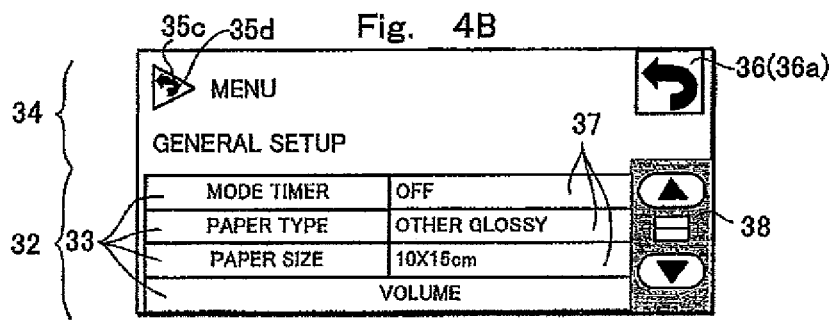
FIG. 4B is a "General Setup" screen having the Return button displayed on the LCD.

In FIG. 4B, the general setup screen belonging to the second level is displayed in the selection display area 32. As shown in FIG. 4B, the general setup screen includes various selections 33 and, when setting values are already stored in the EEPROM 15 or the like in association with these selections 33, may display a setting description 37 next to the corresponding selection 33 that includes a character string expressing the setting value.

By providing the return position marker 35d in the separating character 35c, as described above, the MFP 1 of the embodiment enables the user to see in advance (i.e., prior to pressing the Return button area 36) which setup screen will be displayed when the user operates the Return button area 36. Accordingly, the displays provided by the MFP 1 are user-friendly. Thus, the MFP 1 eliminates any surprise and regret the user may feel when the display shifts to a setup screen of an unexpected higher level as a result of operating the Return button area 36 without being aware of the destination setup screen, for example.

Further, by adding the return position marker 35d to the separating character 35c, the separating character 35c takes on two functions: separating screen titles within the breadcrumbs 35b and indicating the destination setup screen. Hence, the breadcrumbs 35b presents more information to the user without increasing the number of characters in the breadcrumbs 35b. As a result, the MFP 1 can provide useful information for facilitating user operations by effectively utilizing the limited display area of the LCD 27.

Figure 4C:
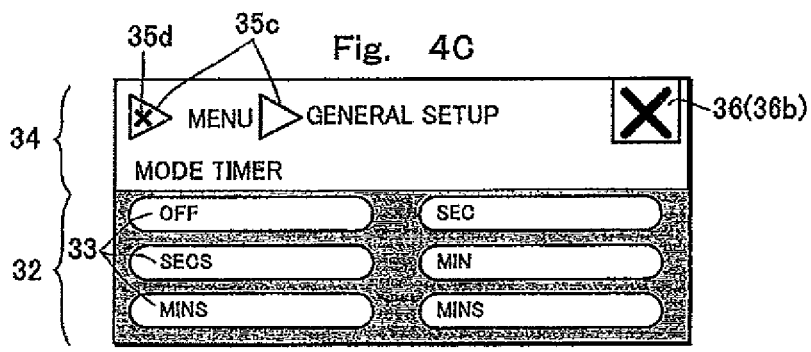
FIG. 4C is the "General Setup" screen having a Cancel button.

The return position marker 35d is an icon or symbol that has the same design as the icon or symbol provided in the Return button area 36. Here, "the same design" denotes a design that the user can identify as having the same shape, and does not require that the design corresponds exactly in terms of size and color. For example, when the "X" symbol is drawn in the Return button area 36, as shown in FIG. 4C, the MFP 1 also includes an "X" symbol in the separating character 35c as the return position marker 35d. This display method is user-friendly because the user can directly grasp the significance of the separating character 35c provided with the return position marker 35d, i.e., that the screen title set apart from other screen titles by the return position marker 35d indicates the destination setup screen that will be displayed when the Return button area 36 is operated.

Figure 4D:
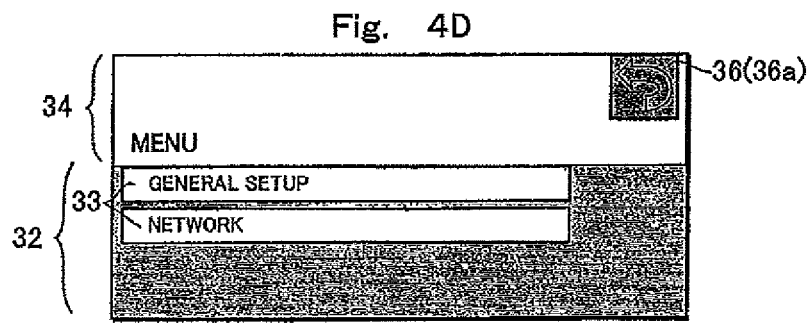
FIG. 4D is a "Menu" screen having a grayed out Return button.

Further, the breadcrumbs 35b may be omitted from the display when the menu screen of the topmost level is displayed in the selection display area 32, as shown in FIG. 4D. In addition, the Return button area 36 may be grayed out when the menu screen is displayed to inform the user that the Return button area 36 cannot be operated at this time.

Further, when the number of selections 33 is too large to be displayed in the selection display area 32 at one time, the MFP 1 may display a sidebar area 38 in the selection display area 32 as shown in FIG. 4B. By operating the sidebar area 38, the user can scroll through the selections 33 to reveal selections 33 outside the display area.

Figure 6:
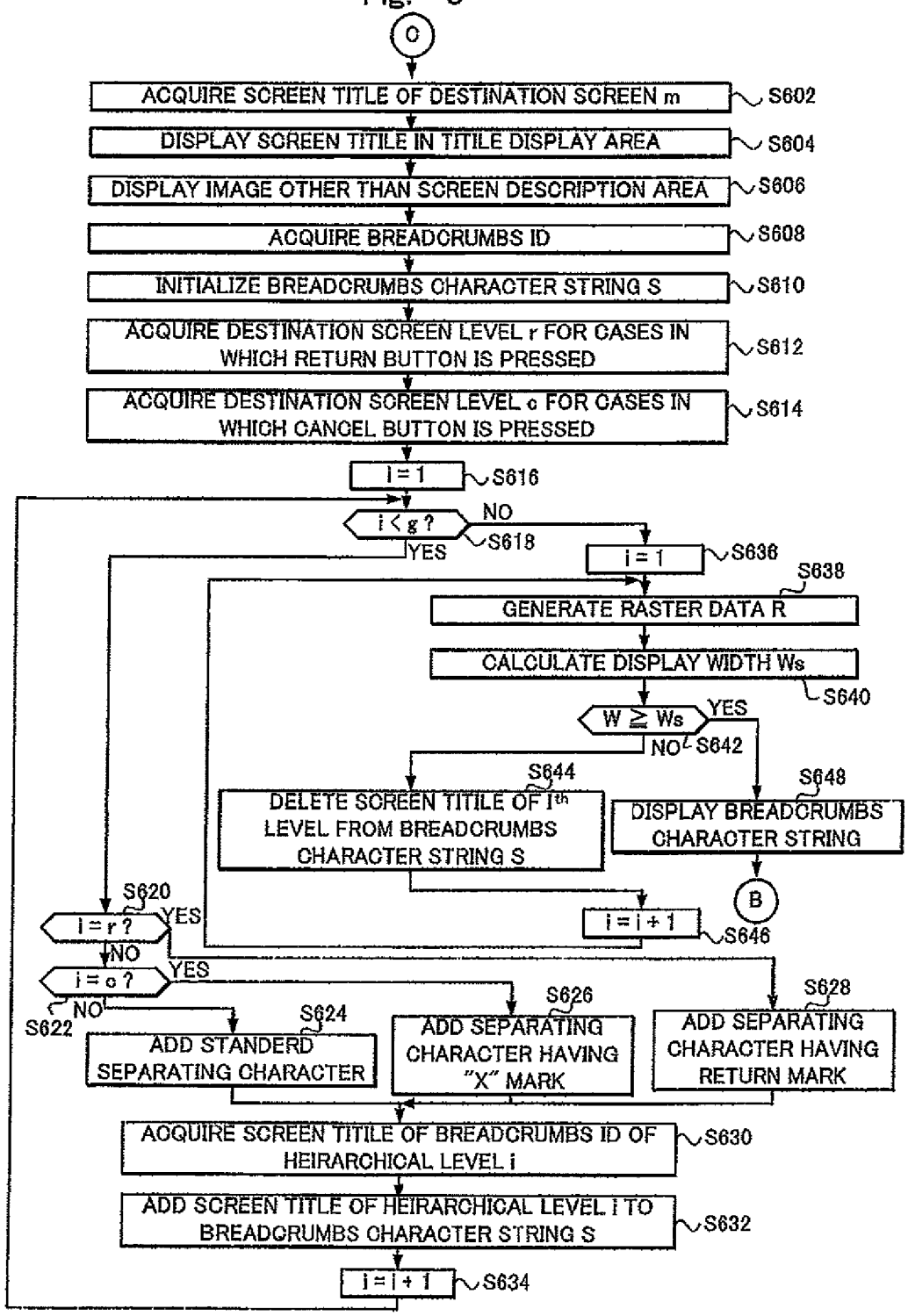
FIG. 6 is a flowchart showing the setup screen display process following the flowchart of FIG. 5.

FIGS. 5 and 6 are flowcharts illustrating steps in the setup screen display process. The MFP 1 periodically executes the setup screen display process when in the setup mode.

In S502 at the beginning of the setup screen display process, the CPU 11 attempts to acquire a screen navigation event. In S504 the CPU 11 determines whether a screen navigation event was acquired. If not (S504: NO), then the CPU 11 returns to S502.

However, if so (S504: YES), then in S506 the CPU 11 acquires a hierarchical level f for a currently displayed setup screen. In S508 the CPU 11 determines whether the screen navigation event acquired in S502 indicates that the Cancel button 36b was pressed (operated). If so (S508: YES), then the CPU 11 advances to S516.

However, if not (S508: NO), then in S510 the CPU 11 determines whether the screen navigation event indicates that a selection 33 was pressed. If so (S510: YES), then the CPU 11 advances to S516 described later.

However, if not (S510: NO), then in S512 the CPU 11 determines whether the screen navigation event indicates that the Return button 36a was pressed. If so (S512: YES), then the CPU 11 advances to S516.

However, if not (S512: NO), then in S514 the CPU 11 determines whether the screen navigation event indicates an instruction to end the setup screen display process. A positive determination is made if, for example, the user inputs an instruction to switch from the setup mode to another mode (S514: YES), the CPU 11 ends the setup screen display process. However, if not (S514: NO), then the CPU 11 returns to S502 and repeats the above process.

In S516 the CPU 11 acquires a destination screen m corresponding to the screen navigation event. For example if the Cancel button 36b is pressed while a setup screen with the screen title "Reset Factory" is displayed (S508: YES), then in S516 the CPU 11 references the screen transition table 12c (see FIG. 3) and acquires the menu screen as the destination screen m. Similarly, if a selection 33 having the character string "TCP/IP" is pressed while the setup screen having the screen title "WLAN" is displayed (S510: YES), then in S516 the CPU 11 references the screen management table 12b (see FIG. 2) and acquires the TCP/IP setup screen (having the screen title "TCP/IP") as the destination screen m. Similarly, if the Return button 36a was pressed while the setup screen having the screen title "WLAN" was displayed (S512: YES), then in S516 the CPU 11 references the screen transition table 12c and acquires the setup screen having the screen title "Network" as the destination screen m. Although not indicated in the flowchart, if the pressed selection 33 corresponds to a setting value (see FIG. 4A), the CPU 11 performs a process to store the corresponding setting value in the EEPROM 15.

In S518 the CPU 11 acquires title IDs from the screen management table 12b for setup screens from the first hierarchical level to the destination screen m and records these title IDs in a breadcrumbs ID. The breadcrumbs ID is a data array in which a single title ID may be recorded for each hierarchical level. The breadcrumbs ID is updated each time the displayed setup screen changes, and a breadcrumbs is created based on the breadcrumbs ID as described later. For example, if the destination screen m is the TCP/IP setup screen in the fourth level, the following data is saved in S518 as the breadcrumbs ID: [1]ID00[2]ID90[3]ID91[4]ID93, where the numbers in "[ ]" correspond to the hierarchical levels and each character string starting with "ID" corresponds to the title ID recorded for the respective setup screen. In this case, the screen navigation path from the menu screen to the TCP/IP setup screen is indicated in a breadcrumbs as ">Menu>Network>WLAN," in the process described later, where the separating character 35c is denoted by the ">" symbol in this specification.

In S520 the CPU 11 acquires a hierarchical level g of the destination screen m. In S522 the CPU 11 determines whether the hierarchical level g is "1". If not (S522: NO), then the CPU 11 advances to S602 of FIG. 6.

However, if so (S522: YES), then in S524 the CPU 11 acquires a screen title for the destination screen m (the setup screen in the first level). In S526 the CPU 11 initializes the breadcrumbs ID. In S528 the CPU 11 records the title ID for the destination screen m in the breadcrumbs ID, and displays the screen title for the destination screen m in the title display area 34a. In S532 the CPU 11 displays (writes) images in areas other than the title display area 34a. Specifically, the CPU 11 displays the destination screen m in the selection display area 32 and draws images in the Return button area 36 and sidebar area 38, thereby changing the display on the LCD 27 to the setup screen in the level corresponding to the user's selection operation or reverse transition operation. Subsequently, the CPU 11 returns to S502.

In S602 of FIG. 6, the CPU 11 acquires the screen title of the destination screen m from the screen management table 12b. In S604 the CPU 11 writes the acquired screen title to the title display area 34a.

In S606 the CPU 11 displays (writes) images in areas other than the screen description area 34. Specifically, the CPU 11 writes the destination screen m in the selection display area 32 and images in the Return button area 36 and sidebar area 38. If the event stored in the screen transition table 12c in association with the destination screen m is "Return button pressed," then the CPU 11 writes the return icon representing the Return button 36a in the Return button area 36. If the event stored in association with the destination screen m is "Cancel button pressed," the CPU 11 writes the "X" symbol representing the Cancel button 36b in the Return button area 36.

In S608 the CPU 11 acquires the breadcrumbs ID and in S610 initializes the breadcrumbs character string S. The breadcrumbs character string S is data representing the breadcrumbs 35b displayed in the breadcrumbs display area 34b as character codes.

In S612 the CPU 11 references the screen transition table 12c to acquire the level number of the destination setup screen stored in association with the currently displayed setup screen as the destination that is displayed when the Return button is pressed (destination screen level r). For example, if the currently displayed setup screen has the screen title "Network," the destination setup screen recorded in the screen transition table 12c for eases in which the Return button is pressed is the menu screen. Accordingly, the CPU 11 acquires the level number "1" for the menu screen as the destination screen level r. If "Return button pressed" is not stored in the screen transition table 12c as an event corresponding to the currently displayed setup screen, then in S612 the CPU 11 acquires a null value as the destination screen level r.

In S614 the CPU 11 references the screen transition table 12c to acquire the level number of the destination setup screen recorded in association with the currently displayed setup screen for a "Cancel button pressed" event (destination screen level c). For example, if the currently displayed setup screen has the screen title "Reset Factory," the setup screen stored as the destination for cases in which the Cancel button is pressed is the menu screen. Accordingly, the CPU 11 acquires the level number "1" for the menu screen as the destination screen level c. If "Cancel button pressed" is not stored as an event corresponding to the currently displayed setup screen, then in S614 the CPU 11 acquires a null value as the destination screen level c.

In S616 the CPU 11 sets a variable i to "1" and in S618 determines whether the variable i is smaller than the hierarchical level g of the currently displayed setup screen. If so (S618: YES), then in S620 the CPU 11 determines whether the variable i is equivalent to the destination screen level r (i=r). If so (S620: YES), then in S628 the CPU 11 adds data equivalent to the separating character 35c with the return icon as the return position marker 35d to the breadcrumbs character string S, and subsequently advances to S630 described later.

However, if not (S620: NO), then in S622 the CPU 11 determines whether the variable i is equivalent to the destination screen level c (i=c). If so (S622: YES), then in S626 the CPU 11 adds data equivalent to the separating character 35c with the "X" symbol as the return position marker 35d to the breadcrumbs character string S, and subsequently advances to S630.

However, if not (S622: NO), then in S624 the CPU 11 adds data equivalent to a standard separating character 35c, that is, a separating character 35c that does not have a return position marker 35d, to the breadcrumbs character string S, and subsequently advances to S630.

In S630 the CPU 11 acquires a title ID for a level i from the breadcrumbs ID and acquires a screen title corresponding to the title ID from the screen management table 12b. In S632, the CPU 11 adds the acquired screen title to the breadcrumbs character string S. In S634, the CPU 11 increments the variable i by "1" and returns to S618.

Through the above process, the MFP 1 can identify a setup screen that is the destination of a reverse transition operation based on the destination screen level r or c each time the setup screen on the LCD 27 changes, and the separating character 35c with the return position marker 35d can be displaced in front of a screen title of thus identified setup screen.

When the CPU 11 determines in S618 that the variable i is greater than or equal to the hierarchical level g (S618: NO), then in S636 the CPU 11 sets the variable to "1". In S638 the CPU 11 rasterizes the breadcrumbs character string S to generate raster data R. In S640 the CPU 11 calculates a display width Ws corresponding to the length of the raster data R in the longitudinal direction. Since the breadcrumbs character string S is rasterized before being displayed as the breadcrumbs 35b in a subsequent process, the CPU 11 can acquire the length of the breadcrumbs 35b (i.e., the horizontal dimension of the character array) to be displayed in the breadcrumbs display area 34b by finding the length (display width Ws) of the rasterized breadcrumbs raster data R.

Figure 7:
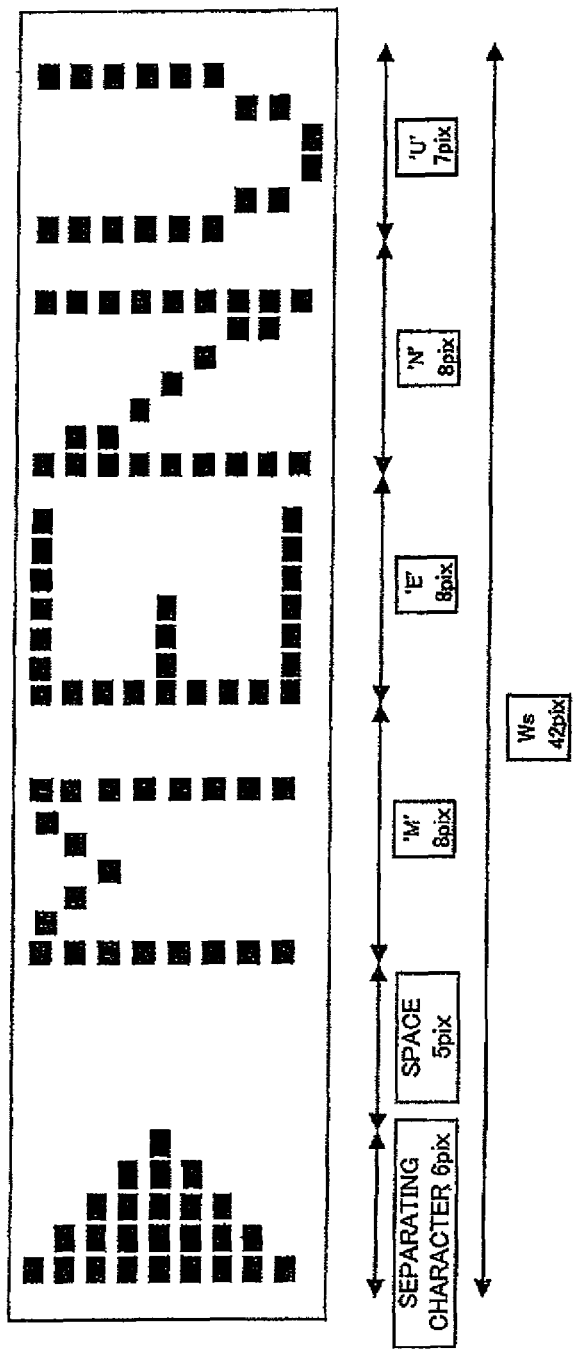
FIG. 7 is an enlarged view of a rasterized breadcrumbs character string.

FIG. 7 is an enlarged view of a breadcrumbs character string S that has been rasterized (raster data R). By rasterizing the breadcrumbs character string S, the CPU 11 acquires bitmap data representing the breadcrumbs 35b in an array of points (pixels). In the embodiment, the CPU 11 totals the number of pixels in the width direction required to display each character and space in order to calculate the display width Ws corresponding to the longitudinal length of the raster data R.

The MFP 1 may also allow the user to set a desired size or font for the text to be displayed on the LCD 27. In this case, in S638 of FIG. 6 the CPU 11 reads values for the text size and font set by the user and develops the breadcrumbs character string S into bitmap data based on these values. For some fonts, the width of each character may differ. With a proportional font, for example, the letter "U" shown in FIG. 7 has a width of seven pixels, while the letters "M", "E", and "N" have respective widths of eight pixels. Further, in many cases the width of roman characters differs from the width of Chinese characters (kanji). Hence, the CPU 11 can acquire a more accurate display width Ws through a calculation based on the rasterized bitmap data than through a calculation simply based on the number of characters.

Returning to FIG. 6, in s642 the CPU 11 determines whether the entire raster data R can be displayed inside the breadcrumbs display area 34b. That is, the CPU 11 determines whether the display width Ws is less than or equal to a predetermined width W, where the predetermined width W is a value equivalent to the number of pixels in the breadcrumbs display area 34b along the horizontal direction (longitudinal direction) thereof that can be used for displaying text.

If so (S642: YES), then in S648 the CPU 11 displays the breadcrumbs 35b in the breadcrumbs display area 34b based on the breadcrumbs character string S.

However, if not (S642: NO), then in S644 the CPU 11 updates the breadcrumbs character string S by deleting a screen title of the $i^{th}$ level from the breadcrumbs character string S, in S646 increments the variable i by "1", and returns to S638 to repeat the process described above. Once the CPU 11 determines that the display width Ws is less than or equal to the predetermined width W (S642: YES), then the CPU 11 rasterizes the breadcrumbs character string S and displays the rasterized breadcrumbs character string S as the breadcrumbs 35b (raster data R) updated earlier by deleting the screen title corresponding to the first (highest) level, or screen titles corresponding to setup screens in a plurality of upper levels including and continuous from the first level (S648). Accordingly, the MFP 1 can present screen titles to the user with priority given to levels nearest the level of the currently displayed setup screen so that the user can quickly recognize in which level the currently displayed setup screen is positioned. Subsequently, the CPU 11 returns to S502.

Through the setup screen display process described in FIGS. 5 and 6, each time the setup screen changes, the MFP 1 identifies a destination setup screen for a reverse transition operation and adds the separating character 35c having the return position marker 35d to a screen title in the breadcrumbs display area 34b corresponding to the destination setup screen. Hence, the MFP 1 always presents updated information indicating the destination setup screen that will be displayed if the reverse transition operation is performed.

While the invention has been described in detail with reference to the embodiment thereof, it would be apparent to those skilled in the art that various changes and modifications may be made therein without departing from the spirit of the invention.

For example, while the breadcrumbs 35b is displayed in one line in the embodiment described above, the breadcrumbs 35b may be displayed in multiple lines with line breaks therebetween. In this case, the predetermined width W compared with the display width Ws would be a value found by multiplying the horizontal width of the breadcrumbs display area 34b by the number of lines available for displaying the breadcrumbs 35b.

In the embodiment described above, the MFP 1 determines whether the breadcrumbs 35b will fit within the breadcrumbs display area 34b based on the display width Ws expressing the horizontal length of the breadcrumbs character string S after rasterization. However, the MFP 1 may be configured to determine whether the breadcrumbs 35b fits within the breadcrumbs display area 34b based on the number of characters in the breadcrumbs character string S.

In the embodiment described above, the Return button area 36 displayed on the LCD 27 functions as a button for performing the reverse transition operation, but an Undo key or Cancel key provided in the operating keys 26 may be used to function as the operating key for the reverse transition operation.

Further, while the return position marker 35d is displayed within the separating character 35c in the embodiment described above, these display elements may be displayed in separate display areas.

What is claimed is:

1. A display device comprising:
   a display unit including a first portion and a second portion;
   a storing unit configured to store a plurality of screen images, a plurality of title strings, a plurality of reverse-transition screen images, and correspondence data indicating a relationship among each of the plurality of screen images, one of the plurality of title strings, and one of the plurality of reverse-transition screen images, the plurality of screen images including a base screen image, a first screen image currently displayed on the first portion, and a second screen image of a lower hierarchical level than the first screen image displayed on the first portion, the plurality of screen images being arranged hierarchically from the base screen image along a screen navigation path starting from the base screen image, the reverse-transition screen image being higher hierarchical level than the first screen image, the plurality of reverse-transition screen images including a first reverse-transition screen image of a first hierarchical level higher than the first screen image; and
   a processor configured to:
   display the first screen image on the first portion;
   display the second screen image on the first portion instead of the first screen image currently displayed on the first portion as an updated first screen image when the first screen image is displayed on the first portion and a user performs a prescribed selection;
   display on the first portion the first reverse-transition screen image corresponding to the first screen image displayed on the first portion instead of the first screen image currently displayed on the first portion as the updated first screen image based on the correspondence data stored in the storing unit when the first screen image is displayed on the first portion and the user performs a first reverse operation;
   displays a navigation string on the second portion based on screen navigation data when the first screen image is displayed on the first portion, the screen navigation data indicating relationships between the screen images, the navigation string including one of the title strings corresponding to one of the screen images when the one of the screen images is positioned in a part of the screen navigation path from the base screen image to the first screen image, wherein the navigation string includes the plurality of title strings corresponding to a plurality of screen images respectively when the plurality of screen images are positioned in a part of the screen navigation path from the base screen image to the first screen image, the plurality of title strings being arranged in hierarchical level order; and
   attach a single mark to one of the title strings corresponding to the first reverse-transition screen image of the first screen image based on the correspondence data stored in the storing unit in order to distinguish the title string attached with the mark from the other title strings.

2. The display device according to claim 1, wherein the processor is configured to display the navigation string including a separating character attached to the head of each title string, and the processor is configured to modify the separating character corresponding to the first reverse-transition screen image to a form different from the other separating character, the processor is configured to attach the modified separating character as the mark to the one of the title strings corresponding to the first reverse-transition screen image of the first screen image.

3. The display device according to claim 1, further comprising an operation unit configured to be operated by the user to input an instruction and that has a prescribed design, wherein the mark has the prescribed design.

4. The display device according to claim 1, wherein the storing unit stores the screen navigation data, indicating a destination screen image as the first reverse-transition screen image for each of the plurality of screen images; and the processor is configured to specify one of the plurality of screen images as the destination screen image for one of the second and first reverse-transition screen images based on the screen navigation data each time the processor changes the first screen image,
   wherein the processor is configured to attach the mark to one of the title strings corresponding to the destination screen image.

5. A method for displaying one of a plurality of screen images on a display unit of a display device, the display device including a storing unit configured to store a plurality of screen images, a plurality of title strings, a plurality of reverse-transition screen images, and correspondence data indicating a relationship among each of the plurality of screen images, one of the plurality of title strings, and one of the plurality of reverse-transition screen images, the plurality of screen images including a base screen image, a first screen image currently displayed on the first portion, and a second screen image of a lower hierarchical level than the first screen image displayed on the first portion, the plurality of screen images being arranged hierarchically from the base screen image along a screen navigation path starting from the base screen image, the reverse-transition screen image being higher hierarchical level than the first screen image, the plurality of reverse-transition screen images including a first reverse-transition screen image of a first hierarchical level higher than the first screen image, the method comprising:
   (a) displaying the first screen image on the first portion;
   (b) displaying the second screen image on the first portion instead of the first screen image currently displayed on the first portion as an updated first screen image when the first screen image is displayed on the first portion and a user performs a prescribed selection;
   (c) displaying on the first portion the first reverse-transition screen image corresponding to the first screen image displayed on the first portion instead of the first screen image currently displayed on the first portion as the updated first screen image based on the correspondence data stored in the storing unit when the first screen image is displayed on the first portion and the user performs a first reverse operation;
   (d) displaying a navigation string on a second portion of the display unit based on screen navigation data when the first screen image is displayed on the first portion, the screen navigation data indicating relationships between the screen images, the navigation string including one of title strings corresponding to one of the screen images when the one of the screen images is positioned in a part of the screen navigation path from the base screen image to the first screen image, wherein the navigation string includes the plurality of title strings corresponding to a plurality of screen images respectively when the plurality of screen images are positioned in a part of the screen navigation path from the base screen image to the first screen image, the plurality of title strings being arranged in hierarchical level order; and
   (e) attaching a single mark to one of the title strings corresponding to the first reverse-transition screen image of the first screen image based on the correspondence data stored in the storing unit in order to distinguish the title string attached with the mark from the other title strings.

6. The method according to claim 5, wherein the displaying step (d) displays the navigation string including a separating character attached to the head of each title string, and the attaching step (e) modifies the separating character corresponding to the first reverse-transition screen image to a form different from the other separating character, further comprising attaching the modified separating character as the mark to the one of the title strings corresponding to the first reverse-transition screen image of the first screen image.

7. The method according to claim 5, wherein the first reverse operation is performed by the user operating an operation unit having a prescribed design, and the mark has the prescribed design.

8. The method according to claim 5, further comprising: (f) specifying one of the plurality of screen images as a destination screen image for one of the second and first reverse-transition screen images each time the first screen image is changed based on the screen navigation data, the screen navigation data indicating the destination screen image as the first reverse-transition screen image for each of the plurality of screen images,
   wherein the attaching step (e) attaches the mark to one of the title strings corresponding to the destination screen image.

9. The display device according to claim 1, wherein the plurality of reverse-transition screen images includes a second reverse-transition screen image of a second hierarchical level higher than the first screen image,
   wherein the processor is configured to display on the first portion the second reverse-transition screen image corresponding to the first screen image instead of the first screen image currently displayed on the first portion as the updated first screen image when the first screen image is displayed on the first portion and the user performs a second reverse operation.

10. The display device according to claim 9, wherein the processor is configured to attach a first mark to one of the title strings corresponding to the first reverse-transition screen image and a second mark to one of the title strings corresponding to the second reverse-transition screen image, the first mark being different from the second mark.

11. The display device according to claim 10, wherein the display unit further includes a first receiving portion for receiving the first reverse operation and a second receiving portion for receiving the second reverse operation,
   wherein the first mark is similar to the first receiving portion and the second mark is similar to the second receiving portion.

12. The display device according to claim 1, wherein when the plurality of screen images is positioned in the part of the screen navigation path, the processor is configured to attach the mark at a position between the title string corresponding to the first reverse-transition screen image and a title string corresponding to a prescribed screen image of a first hierarchical level higher than the first reverse-transition screen image.

13. The display device according to claim 12, wherein the plurality of title strings is arranged from left to right in hierarchical level order,
   wherein the processor is configured to attach the mark at a position between a left side of the title string corresponding to the first reverse-transition screen image and right side of the title string corresponding to the prescribed screen image.

14. The display device according to claim 13, wherein the processor is configured to attach the mark at a position nearer to the left side of the title string corresponding to the first reverse-transition screen image than the right side of the title string corresponding to the prescribed screen image.

15. The display device according to claim 13, wherein the navigation string is a breadcrumbs character string.

* * * * *